(12) United States Patent
Sakurai

(10) Patent No.: US 8,529,003 B2
(45) Date of Patent: Sep. 10, 2013

(54) PRINT HEAD

(75) Inventor: Masataka Sakurai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 247 days.

(21) Appl. No.: 13/043,623

(22) Filed: Mar. 9, 2011

(65) Prior Publication Data

US 2011/0242161 A1  Oct. 6, 2011

(30) Foreign Application Priority Data

Apr. 1, 2010 (JP) ................................. 2010-085540

(51) Int. Cl.
*B41J 29/38* (2006.01)
*B41J 29/393* (2006.01)

(52) U.S. Cl.
USPC ................................................ 347/9; 347/20

(58) Field of Classification Search
USPC .................................................. 347/9–11, 20
See application file for complete search history.

(56) References Cited

U.S. PATENT DOCUMENTS

| | | | |
|---|---|---|---|
| 6,945,622 B2 | 9/2005 | Sakurai | |
| 7,354,125 B2 | 4/2008 | Hirayama et al. | |
| 7,815,272 B2 | 10/2010 | Kasai et al. | |
| 7,918,538 B2 | 4/2011 | Sakurai | |
| 7,922,276 B2 * | 4/2011 | Hu et al. | 347/9 |
| 2006/0209131 A1 * | 9/2006 | Furukawa | 347/56 |
| 2009/0174753 A1 | 7/2009 | Kurokawa et al. | |
| 2011/0012950 A1 | 1/2011 | Hirayama et al. | |

FOREIGN PATENT DOCUMENTS

JP  2005-199703 A  7/2005

* cited by examiner

*Primary Examiner* — Jason Uhlenhake
(74) *Attorney, Agent, or Firm* — Fitzpatrick, Cella, Harper & Scinto

(57) ABSTRACT

A print head is provided in which a plurality of printing elements, switching elements and driving circuits that are adjacent to each other are divided into groups. The print head includes a buffer circuit. The buffer circuit receives input from signal lines corresponding to binary block selection data for selecting a block, the block being formed by selecting and collecting one printing element from each group. The buffer circuit also outputs to each logic element of a block selection circuit via signal lines, provided in the same number as the signal lines corresponding to binary block selection data. Each logic element selects a block based on the block selecting data, and only one bit of the logic levels of the signal lines input to a buffer circuit is inverted between two adjacent logic elements. An inverter is provided for that one bit of inversion.

9 Claims, 9 Drawing Sheets

FIG. 8

| input | | | | output | | | | | | | | | | | | | | | |
|---|---|---|---|---|---|---|---|---|---|---|---|---|---|---|---|---|---|---|---|
| B1 | B2 | B3 | B4 | BLE 1 | BLE 2 | BLE 3 | BLE 4 | BLE 5 | BLE 6 | BLE 7 | BLE 8 | BLE 9 | BLE 10 | BLE 11 | BLE 12 | BLE 13 | BLE 14 | BLE 15 | BLE 16 |
| L | L | L | L | H | L | L | L | L | L | L | L | L | L | L | L | L | L | L | L |
| H | L | L | L | L | H | L | L | L | L | L | L | L | L | L | L | L | L | L | L |
| L | H | L | L | L | L | H | L | L | L | L | L | L | L | L | L | L | L | L | L |
| H | H | L | L | L | L | L | H | L | L | L | L | L | L | L | L | L | L | L | L |
| L | L | H | L | L | L | L | L | H | L | L | L | L | L | L | L | L | L | L | L |
| H | L | H | L | L | L | L | L | L | H | L | L | L | L | L | L | L | L | L | L |
| L | H | H | L | L | L | L | L | L | L | H | L | L | L | L | L | L | L | L | L |
| H | H | H | L | L | L | L | L | L | L | L | H | L | L | L | L | L | L | L | L |
| L | L | L | H | L | L | L | L | L | L | L | L | H | L | L | L | L | L | L | L |
| H | L | L | H | L | L | L | L | L | L | L | L | L | H | L | L | L | L | L | L |
| L | H | L | H | L | L | L | L | L | L | L | L | L | L | H | L | L | L | L | L |
| H | H | L | H | L | L | L | L | L | L | L | L | L | L | L | H | L | L | L | L |
| L | L | H | H | L | L | L | L | L | L | L | L | L | L | L | L | H | L | L | L |
| H | L | H | H | L | L | L | L | L | L | L | L | L | L | L | L | L | H | L | L |
| L | H | H | H | L | L | L | L | L | L | L | L | L | L | L | L | L | L | H | L |
| H | H | H | H | L | L | L | L | L | L | L | L | L | L | L | L | L | L | L | H |

// PRINT HEAD

BACKGROUND OF THE INVENTION

1. Field of the Invention

The present invention relates to a print head for discharging ink.

2. Description of the Related Art

In a configuration of a print head of a printing apparatus, a technique is widely used in which nozzles (recording devices) that perform discharge are divided into groups, thereby reducing ampacity. Generally, electric heat converters necessary for discharging ink from a print head and switching elements for driving the electric heat converters are formed on the same element substrate. Heater selecting circuits for selecting a switching element, shift registers and decoders are also provided on such an element substrate. The shift register is used for holding a group selection signal for selecting an arbitrary group from a plurality of groups, and the decoder is used for selecting an arbitrary nozzle from among a plurality of nozzles. A typical configuration on the element substrate is such that a supply opening for introducing ink from a back face of the substrate to a front face is disposed at the center of the substrate, and heaters, switching elements, and heater selecting circuits are arranged around the supply opening. Accordingly, with such a configuration, the shift registers, the decoders or the like are arranged in an end portion on the substrate together with pads arranged in the end portion for receiving input from signal lines.

However, as the number of nozzle groups increases, the number of output signals from the shift registers also increases. As a result, the circuit size of the shift register increases, and moreover, the substrate size also increases due to the area occupied by wirings corresponding to the increased number of output signals.

Japanese Patent Laid-Open No. 2005-199703 discloses a substrate in which one-bit shift registers are arranged distributed in the vicinity of the respective nozzle groups. The configuration disclosed in Japanese Patent Laid-Open No. 2005-199703 suppresses an increase in the circuit size of the shift register, and also is considered to be effective in suppressing an increase in the substrate size due to the area occupied by wirings corresponding to the number of output signals.

In addition, Japanese Patent Laid-Open No. 2005-199703 discloses a configuration in which not only the shift registers, but also logic elements included in the decoder are also arranged distributed in the vicinity of the respective nozzle groups. With such a configuration, it is considered to be possible to suppress further increase in the substrate size. However, since two types of signal lines for an inverse signal and a non-inverse signal of a logical value are wired from the substrate end portion to the decoder, the area occupied by these wirings will be large.

SUMMARY OF THE INVENTION

An aspect of the present invention is to eliminate the above-mentioned problems with the conventional technology. The present invention provides an element substrate of a print head in which an increase in the number of signal wirings is suppressed.

The present invention in its first aspect provides a print head comprising: a plurality of printing elements; a plurality of switching elements that are respectively connected to the plurality of printing elements and control current flow to the plurality of printing elements; an input circuit that receives an input of information for selecting a printing element of the plurality of printing elements; and a decoding circuit that outputs a selection signal based on the information received by the input circuit, wherein the decoding circuit comprises: first and second common signal lines for supplying selection signals to the plurality of printing elements; an inverter for inverting signal logic; a first logic element that is included in a plurality of logic elements connected in parallel to the first and second common signal lines and that outputs a selection signal for selecting a first printing element out of the plurality of printing elements; and a second logic element that is included in a plurality of logic elements connected in parallel to the first and second common signal lines and that outputs a selection signal for selecting a second printing element out of the plurality of printing elements, and the inverter is connected between a connection point in the first common signal line to the first logic element and a connection point in the first common signal line to the second logic element.

According to the present invention, an increase in the substrate size can be suppressed by preventing the number of signal wirings from increasing.

Further features of the present invention will become apparent from the following description of exemplary embodiments with reference to the attached drawings.

BRIEF DESCRIPTION OF THE DRAWINGS

FIG. 8 is a diagram showing a truth table of the decoder shown in FIG. 7.

DESCRIPTION OF THE EMBODIMENTS

Figure 1:
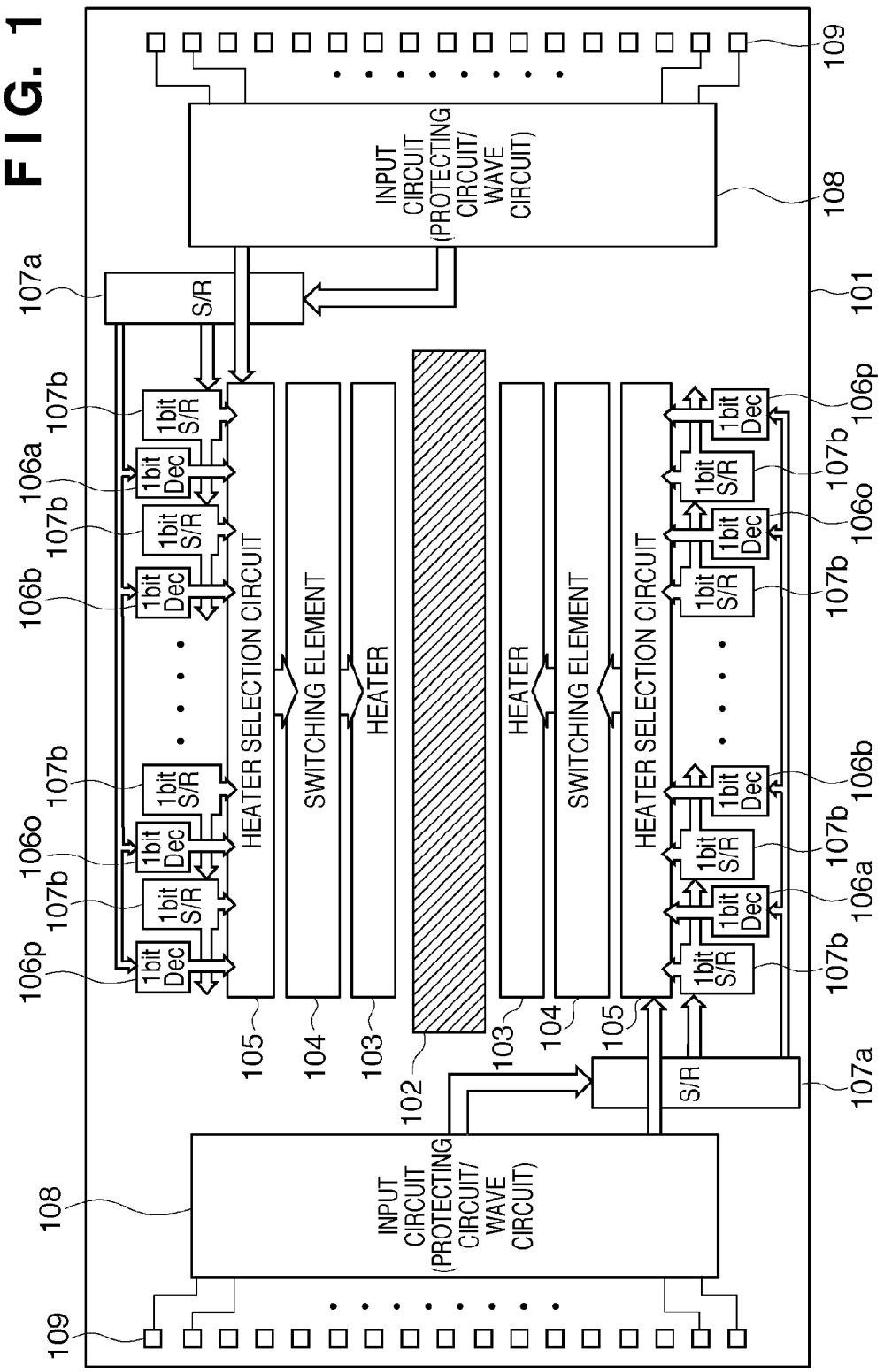
FIG. 1 is a diagram illustrating a configuration of an element substrate of a print head according to a first embodiment.

Preferred embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals are assigned to the same constituent elements, and a repeated description thereof is omitted.

First Embodiment

FIG. 1 is a block diagram illustrating a configuration of a substrate 101 in which electric heat converters for generating heat energy necessary for discharging ink from a print head and switching elements for driving the electric heat converters are formed on the same element substrate, according to an embodiment of the present invention. The arrows indicate the flow of signals. Approximately at the center of the substrate 101, a supply opening 102 for introducing ink from a back face of the substrate to a front face is disposed. Heaters (printing elements) 103, switching elements 104 that control current flow to the heaters, and heater selecting circuits (driving circuit) 105 that select and drive a switching element are arranged so as to be line-symmetric with respect to the supply opening 102. Power supply voltage and logic signals such as printing data are input from a printing apparatus via a plurality of pads 109 disposed at end portions of the substrate 101.

Logic signals input via the pads 109 are transmitted to a logic circuit inside the substrate 101 via input circuits 108. Here, part of the logic signals is input to a shift register 107a. The shift register (holding circuit) 107a holds input serial data, converts the serial data into parallel data, and outputs the parallel data. The serial data contains information for selecting a block. Parallel data output from the shift register 107a is input to a decoder (decoding circuit) 111 via a buffer (also referred to as a buffer circuit) 110 shown in FIG. 2. The decoder 111 includes logic elements (1-bit Dec) 106a to 106p arranged distributed in the alignment direction of the printing element 103. In the decoder 111, output data corresponding to the input bit number is generated, and the output data is output from the logic elements 106a to 106p to the heater selecting circuit 105. The buffer 110 functions to perform waveform shaping and signal current amplification on block control data (B1 to Bn) signals, and at the same time, functions as a signal generating unit for generating signals to be input to the decoder 111.

Data output from shift registers (holding circuits) 107b arranged distributed in the arrangement direction of nozzles is output to the heater selecting circuit 105 with signals from the input circuit 108. The heater selecting circuit 105 selects an arbitrary switching element 104 based on the outputs from the input circuit 108, the logic elements 106a to 106p of the decoder 111, and the shift registers 107b, and applies a driving current for a certain period of time to the heater 103 corresponding to the selected switching element 104. Although not shown in FIG. 1, the input circuit 108 includes a Schmitt trigger circuit, a protecting circuit for protecting circuits in the substrate 101 from electrostatic damage, and the like.

Figure 2:
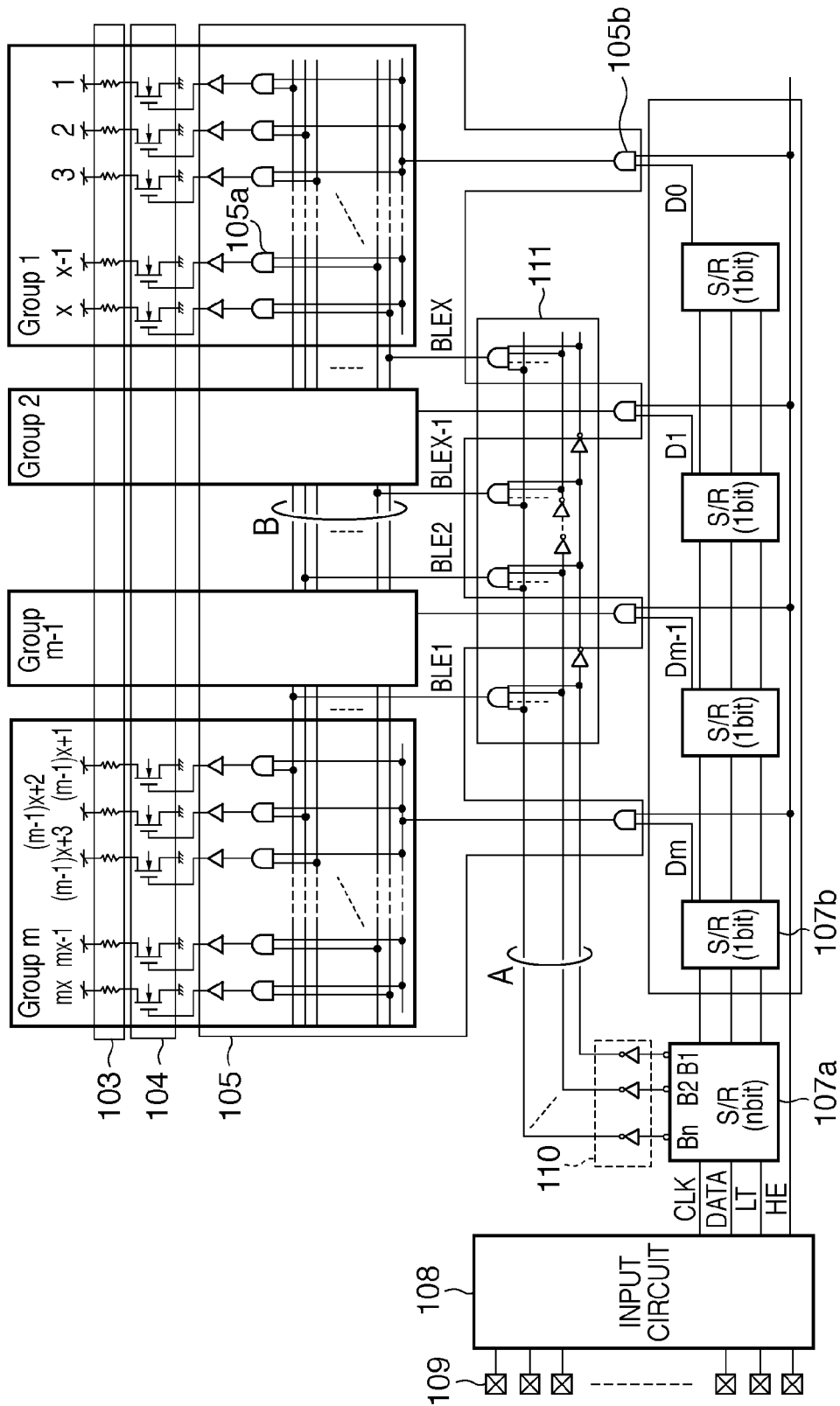
FIG. 2 is a diagram illustrating a configuration around a decoder according to the first embodiment.
Figure 3:
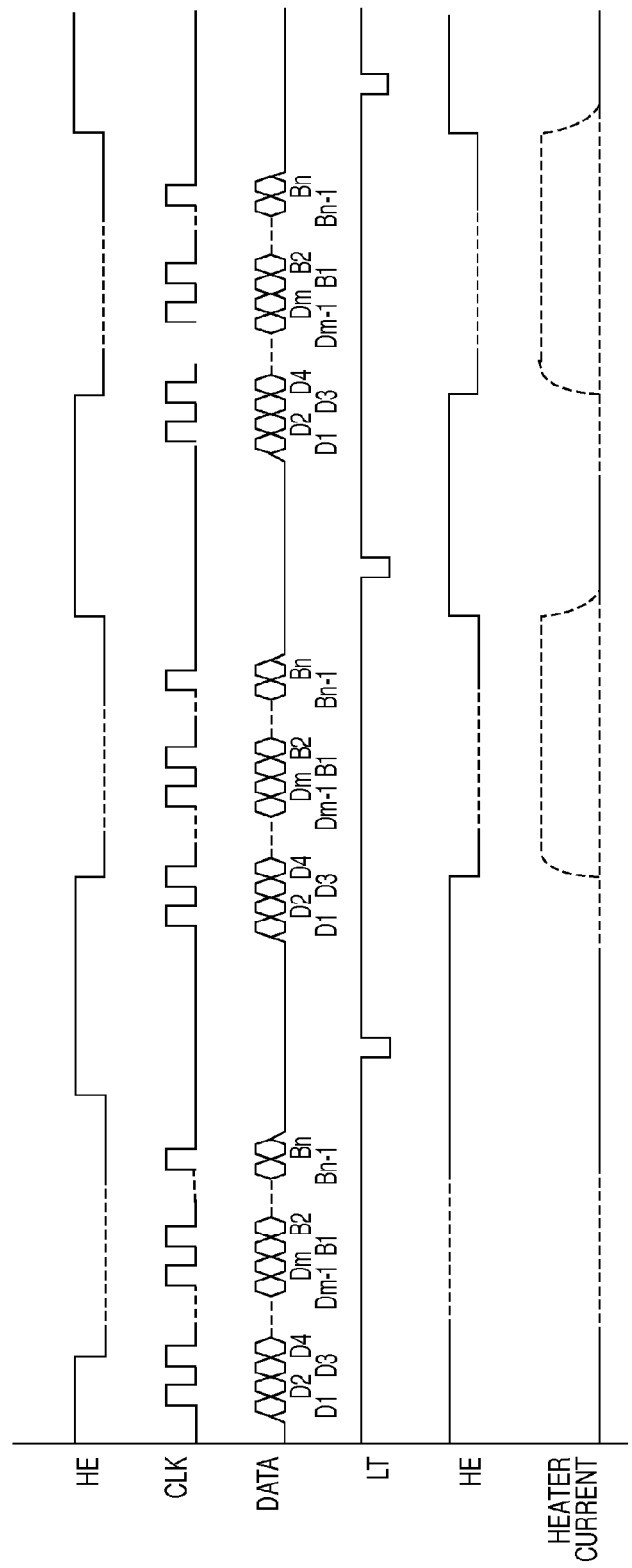
FIG. 3 shows a timing chart of signals used in FIG. 2.

FIG. 2 is a diagram illustrating a configuration of one of a pair of circuit blocks in the substrate 101 shown in FIG. 1 that are opposing each other with the supply opening 102 interposed therebetween. Also, the timing chart of signals input in the block diagram is shown in FIG. 3. As shown in FIG. 2, x number of successive nozzles (also referred to as "segments") forms one group, and m number of groups (Group 1 to Group m) are arranged. Here, nozzles (printing elements) are selected by the shift registers 107b, the decoder 111, and the buffer 110. The heater selecting circuit (driving circuit) 105 includes logic elements (AND gates) 105a and 105b. The logic element 105a outputs a result of logic operation using the outputs from the decoder 111 and a shift register 107b. The logic element 105b outputs a result of logic operation using the outputs from a shift register 107b and a heat enabling signal HE. A collection of segments formed by selecting one segment from each group is called a block. Note that the shift register 107b is an example of a group selection circuit and the decoder 111 is an example of a block selection circuit of the present embodiment.

A clock signal CLK, a printing data signal DATA and a latch signal LT shown in FIG. 3 are input to the shift register 107a via the input circuit 108. As shown in the timing chart in FIG. 3, the printing data signal DATA is input in synchronization with the rising edge and the trailing edge of the clock signal CLK. The printing data signal DATA contains group selection signals (D1 to Dm) respectively corresponding to Group 1 to Group m. The group for which the level of the corresponding group selection signal is high is selected, and the selected group is activated for a period of time during which the heat enabling signal HE (low active) is input. Returning to the description of FIG. 2, one group includes x number of segments. Selection of a segment within the group is carried out by using output from the decoder 111. The decoder 111, based on binary block control data (B1 to Bn) input from the shift register 107a, selectively sets the logic level of one of the output block selection signals (BLE1 to BLEx) to high. Reference symbol A denotes a bus for transferring the block control data (B1 to Bn), which is constituted by n number of signal lines. Reference symbol B denotes a bus for transferring the block selection signals (BLE1 to BLEx), which is constituted by x number of signal lines. This bus B is connected to the respective groups in common. The bus A and bus B are arranged along the alignment direction of the heaters 103, as shown in FIG. 2.

As described above, a segment that corresponds to one of the output signals BLE1 to BLEx that is activated in a group activated by the signal D1 to Dm receives the application of a heater current while the level of the heat enabling signal HE is set to "active". The respective segments are driven while sequentially switching the activated signal among the signals BLE1 to BLEx and selecting a group, thereby forming one line of an image.

Hereinafter, the configuration of the decoder 111 according to the present embodiment is described.

Figure 7:
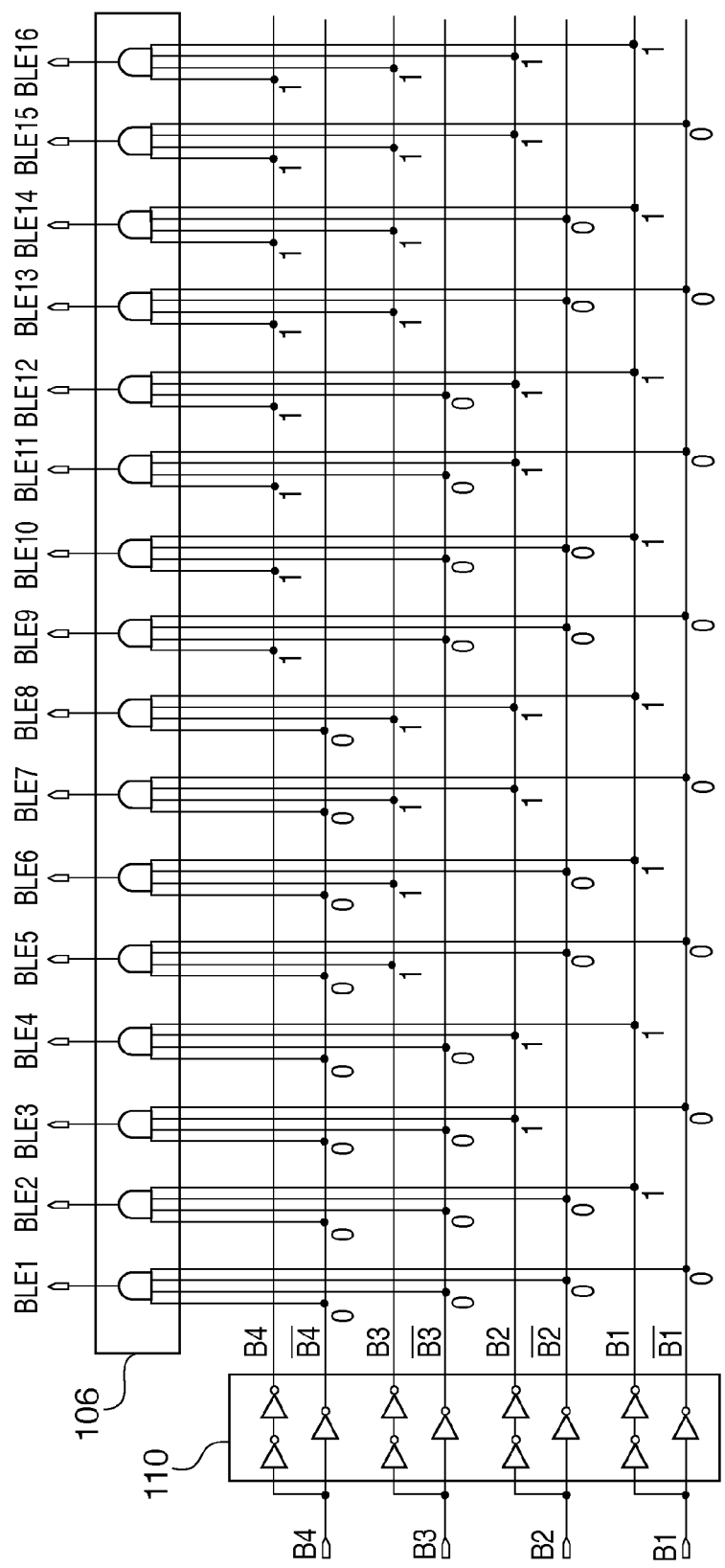
FIG. 7 is a diagram illustrating a configuration of a conventional decoder.
Figure 9:
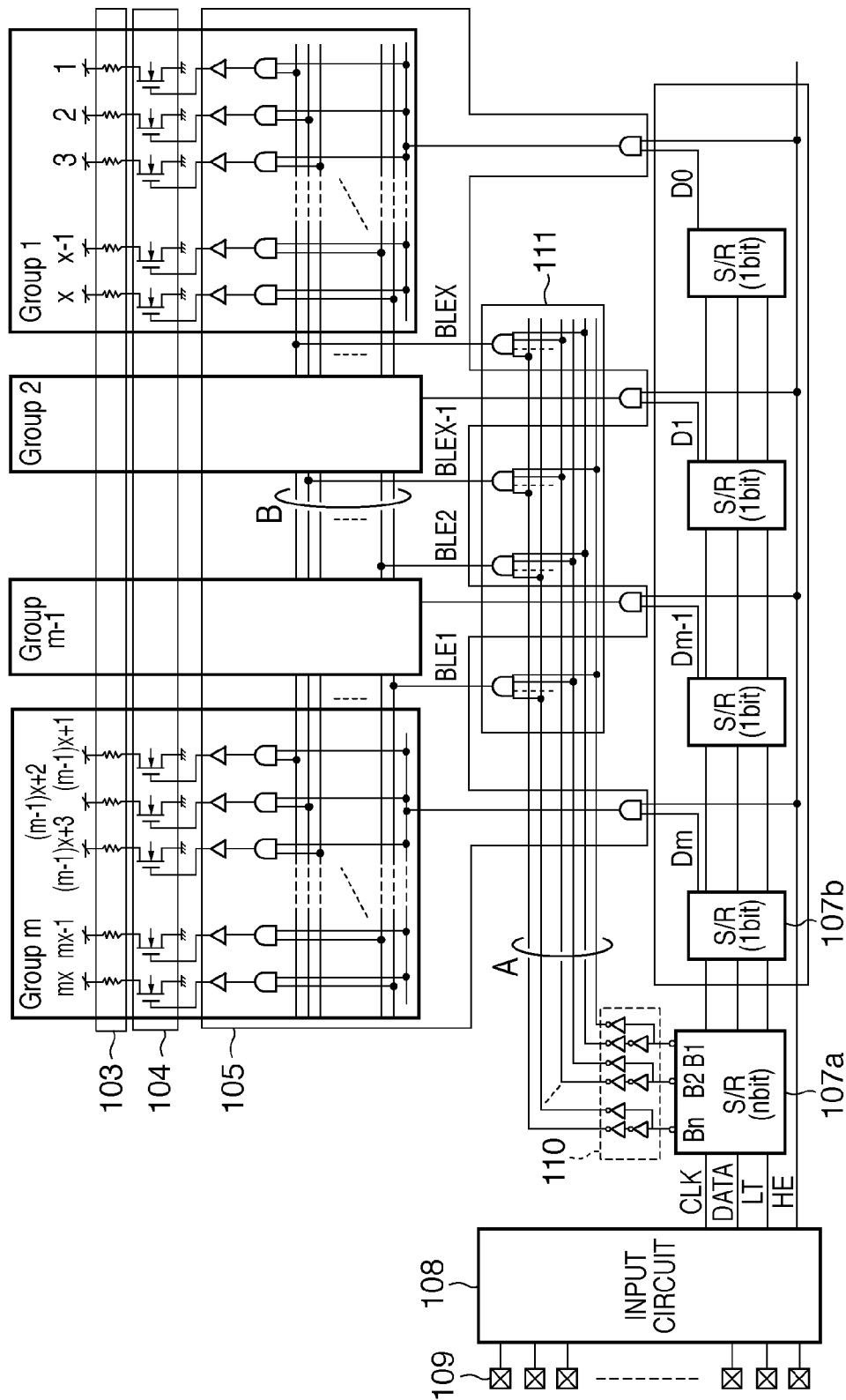
FIG. 9 is a diagram illustrating a configuration around a decoder to which the present invention is not applied.

FIG. 7 is a circuit diagram illustrating a configuration of a conventional decoder. FIG. 9 illustrates a configuration in which the decoder 111 shown in FIG. 7 is used for the purpose of comparison with FIG. 2. Note that FIG. 9 shows a decoder with which the input bit number is 4 and the output bit number is 16. In the conventional decoder shown in FIG. 7, the buffer 110 inverts or does not invert the logics of input data (block selection data) B1 to B4, and the resultant data is input to output gates 106 that are an AND gate group. The output gates 106 respectively select corresponding non-inversion data or inversion data of B1 to B4, and output the signals BLE1 to BLE16 from the decoder 111. The decoder 111 shown in FIG. 7 operates according to a truth table shown in FIG. 8.

Figure 4:
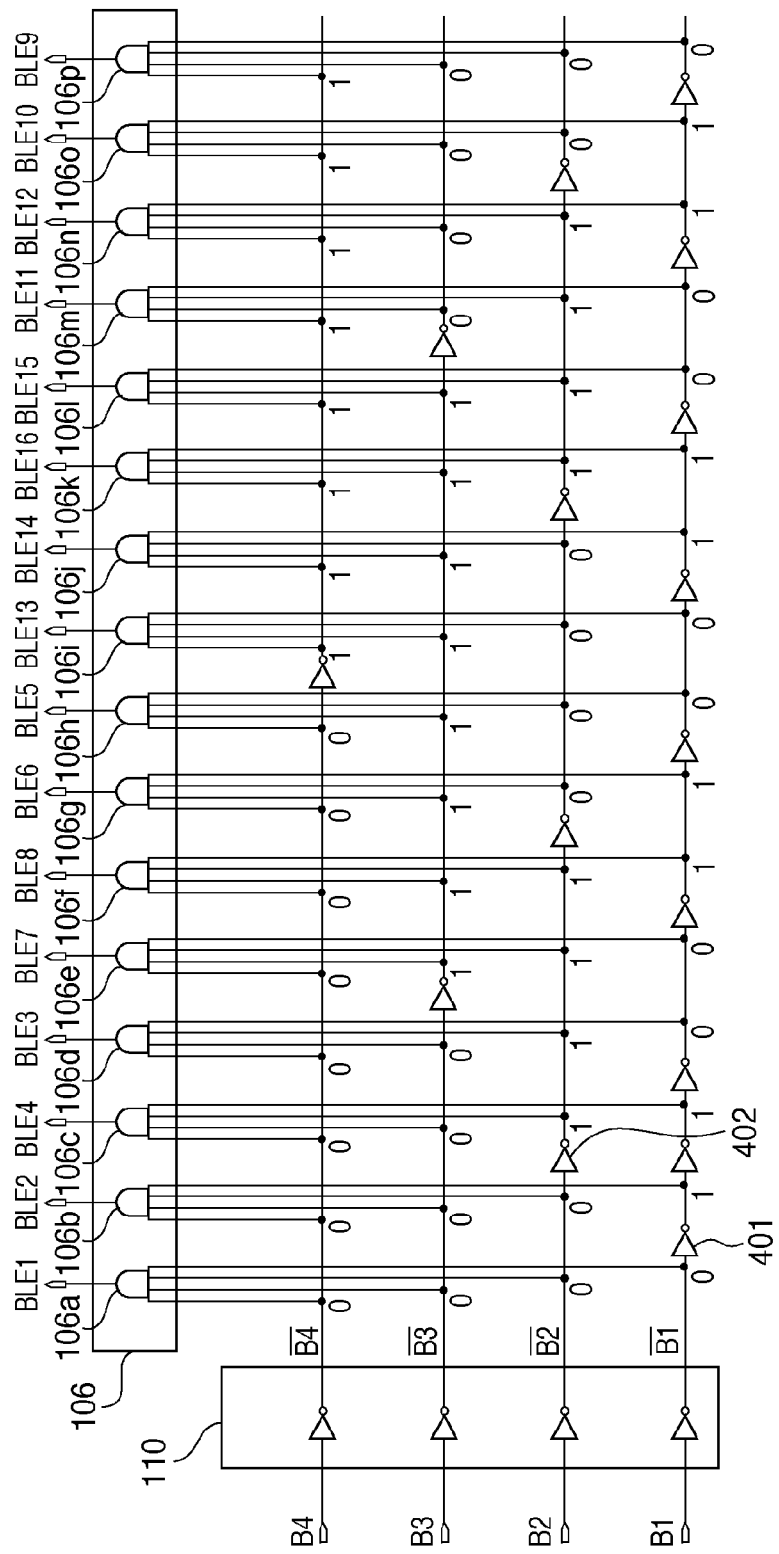
FIG. 4 is a diagram illustrating a configuration of a decoder according to the first embodiment.

FIG. 4 shows a circuitry diagram illustrating a configuration of the decoder 111 according to the present embodiment. Note that in FIG. 4, a decoder with which the input bit number is 4 and the output bit number is 16, as in FIG. 7, is shown. The decoder 111 shown in FIG. 4 also operates according to the truth table shown in FIG. 8. In the decoder 111, logic elements (AND gates 106a to 106p) in the same number as that of the blocks (16 in FIG. 4) are arranged. Here, although AND gates are used as the logic element, the logic element is not limited to the AND gates, and NAND gates may be used instead. In the present embodiment, for example, the AND gate 106a outputs a signal BLE 1 for selecting printing elements belonging to a first block, and the AND gate 106b outputs a signal BLE 2 for selecting printing elements belonging to a second block. The AND gate 106c outputs a signal BLE 3 for selecting printing elements belonging to a third block. Similarly, the other AND gates each output a signal for selecting printing elements belonging to the corresponding block. In other words, the AND gates each output a signal for controlling switching elements of the corresponding block. In this decoder, 16 AND gates 106a to 106p are connected to common signal lines in parallel so as to receive input data B1 to B4. The AND gates 106a to 106p each receive input data B1 via their respective individual wirings connected to a first common signal line, and receive input data B2 via their respective individual wirings connected to a second common signal line. The AND gates 106a to 106p each select their respective corresponding blocks on the condition that the corresponding individual wirings have the same logic levels (e.g., the level of all gate inputs is high). For example, FIG. 4 shows a case in which the input values of the input data B1 to B4 are all 1, and the data of all individual wirings connected to the AND gate 106k has the value of 1. In this case, the signal BLE 16 output by the AND gate 106k becomes valid, and other signals BLE 1 to BLE 15 become invalid.

In the present embodiment, the logics of the input data B1 to B4 are inverted in the buffer 110, and the same number of signal lines as that of the input data B1 to B4 are connected to the AND gates 106a to 106p of the decoder 111. Here, in FIG. 7, with respect to a single signal input, two data sets are supplied to each AND gate, namely one in which the logic value of the single signal is not inverted and another in which the logic value is inverted. However, in the present embodiment, as shown in FIG. 4, only the inversion data is supplied from the buffer 110 to each AND gate.

As shown in FIG. 4, an AND gate 106a (first logic element) that is the closest to the buffer 110 directly receives inversion data of the input data B1 to B4, and only when the level of all of the input data B1 to B4 is 0(L), the output BLE 1 becomes 1(H).

Also, as shown in FIG. 4, an inverter 401 is inserted only for the input data B1 between the AND gates 106a and 106b (second logic element). That is, the inverter 401 is connected to the first common signal line. The AND gate 106b receives non-inversion data only for the input data B1, and receives inversion data for the input data B2 to B4. Specifically, when the input data B1 is 1(H) and the input data B2 to B4 is 0(L), the output BLE 2 becomes 1(H).

An inverter 402 is inserted only for the input data B2 between the AND gates 106b and 106c (third logic element). That is, the inverter 402 is connected to the second common signal line. The AND gate 106c receives the input data B2 as inversion data inverted by the inverter 402. Accordingly, when the input data B1 and B2 are 1(H), and the input data B3 and B4 are 0(L), the output BLE 4 becomes 1(H). Hereinafter, inverters are arranged one each between two adjacent gates out of the AND gate 106b to 106p, thereby achieving a configuration in which the input data B1 to B4 are transferred from one AND gate to an adjacent AND gate by inverting the logic of the input data B1 to B4 one at a time. As described above, one inverter for inverting the logic level of the signal is connected between the connection points to the first common signal line or second common signal line of two adjacent logic elements. Such connection of the inverter is also applied to a third common signal line for inputting the input data B3 and a fourth common signal line for inputting the input data B4.

The AND gates 106a to 106p are arranged as described above such that the logic input thereto is in the Gray code sequence. "The Gray code sequence" referred to here means the order in which only one bit is inverted between the input logic levels of two adjacent AND gates. The truth table of the decoder is the same as that shown in FIG. 8, and the AND gates are arranged such that the input logic levels are in the Gray code sequence.

As shown in FIG. 4, by arranging the AND gates 106a to 106p such that the input logic levels are in the Gray code sequence, the number of inverters inserted in the common signal line between two adjacent AND gates is one, namely, one of the signal lines for the input data B1 to B4. Consequently, even when inverters are arranged, the substrate size is not increased. Also compared with FIG. 7, the number of signal lines can be reduced by half. As clearly seen by comparing FIG. 2 with FIG. 9, the width of the bus A in the substrate 101 (width in the direction intersecting the alignment direction of the printing elements) can be reduced. In this manner, the area occupied by the bus A can be reduced, and thus an increase in the substrate size due to the area occupied by wirings is largely suppressed.

Furthermore, since these inverters are inserted in the wirings for supplying input data to the AND gates, an effect of correcting distortion of the signal wave due to parasitic capacitance and parasitic resistance in the wiring is also achieved. In the example of FIG. 4, only one inverter is inserted in the common signal line for the input data B4, which is the smallest number, but that inverter is arranged in the middle area of the wiring, which is optimal for waveform shaping. However, in the present embodiment, if the length of the wiring is too long to achieve a waveform shaping effect by simply arranging one inverter in the middle area thereof, inverters and/or buffers may be appropriately arranged so as to achieve a repeater effect, without sticking to the Gray code sequence. In such a case, there may be a case in which the number of inverters arranged between adjacent AND gates for inverting the input logic is not one but two or more. In such a case as well, along with the repeater effect, an effect of suppressing an increase in the substrate size can be similarly achieved.

Second Embodiment

Next, a second embodiment according to the present invention is described.

Figure 5:
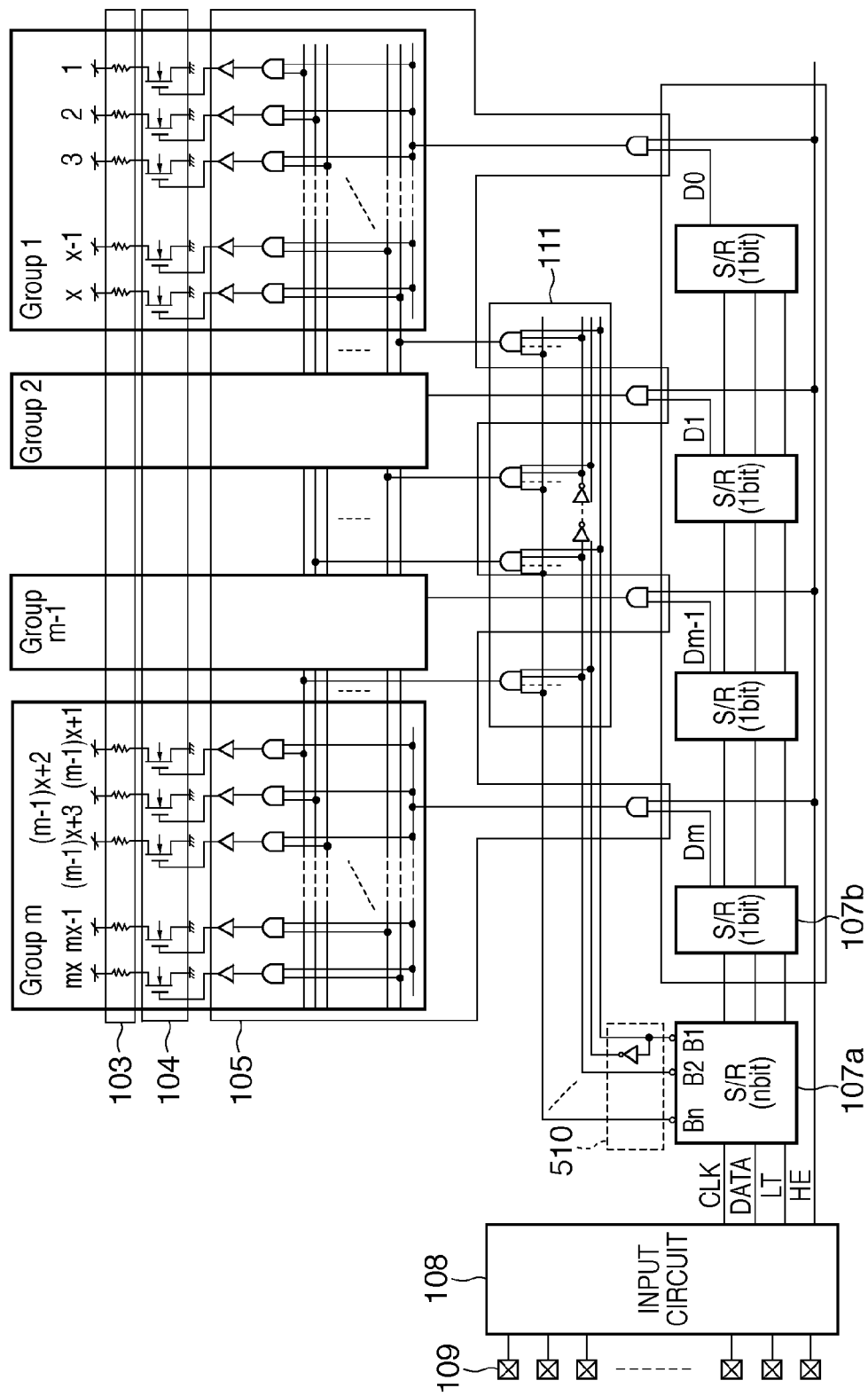
FIG. 5 is a diagram illustrating a configuration around a decoder according to a second embodiment.
Figure 6:
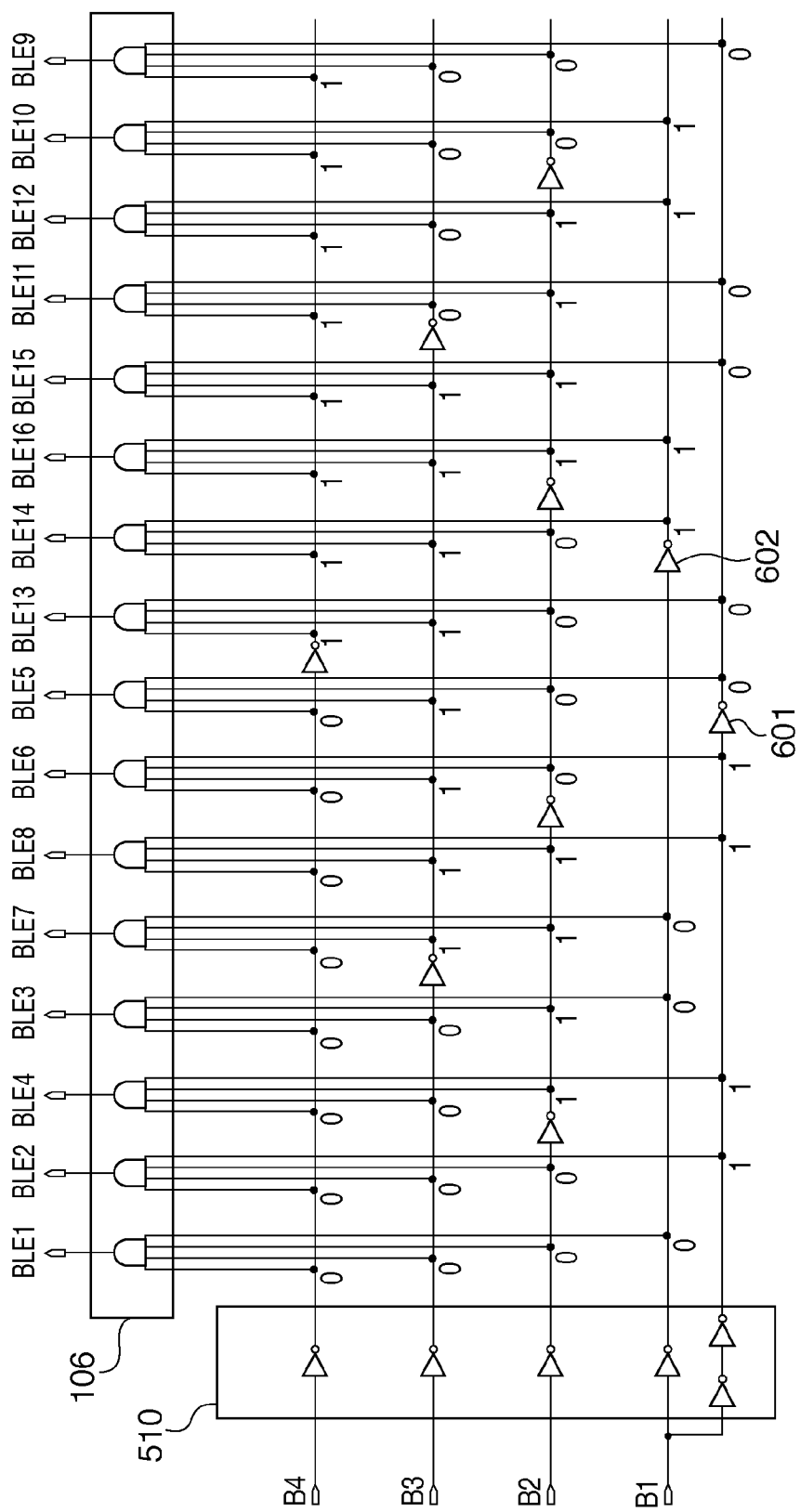
FIG. 6 is a diagram illustrating a configuration of a decoder according to the second embodiment.

FIG. 5 is a block diagram illustrating a configuration of the present embodiment, and FIG. 6 is a circuit diagram illustrating a configuration of the decoder 111. Note that similar to the configuration in FIG. 7, FIG. 5 shows a decoder with which the input bit number is 4 and the output bit number is 16.

As shown in FIG. 4, the first embodiment has a configuration in which logic is inverted in all of the signal lines for the input data B1 to B4 to the decoder 111, by arranging an inverter between at least one pair of adjacent AND gates out of the AND gates 106a to 106p. However, especially when focusing on the wiring for the input data B1 in FIG. 4, eight inverters are inserted between the AND gates 106a and 106p. When a signal is transmitted via eight inverters, a delay due to switching at the gates, namely, a gate delay is anticipated to be large. The number of inverters increases two-fold as the input bit number increases by one bit from 4 bits, which is given as the example of the input bit number, and therefore if the input bit number increases, there is a concern for further gate delay.

By contrast, the decoder 111 of the present embodiment is configured as illustrated in FIG. 6. As illustrated in FIG. 6, logic inversion between adjacent AND gates is not carried out for all of the input signals of the input data B1 to B4. Specifically, as for the input data B1 that is the least significant bit, in the input unit thereof, a buffer 510 generates both a non-inverse signal and an inverse signal, and two signal lines for these signals are arranged in the arrangement direction of the segments.

For this reason, in the first embodiment, four common signal lines are provided, which is the same as the input bit number, but in the present embodiment, five common signal lines are provided. In the first embodiment, although the maximum number of inverters inserted between adjacent AND gates in a single common signal line is eight, in the present embodiment, four inverters are inserted in the common signal line for the input data B2, which is the maximum number provided in any lines. As a result, the gate delay can be reduced by half compared with the gate delay in the first embodiment.

Note that here, inverters 601 and 602 are respectively inserted in the wirings for transmitting the non-inverse signal and the inverse signal of the input data B1. The inverters 601 and 602 also function as a repeater for correcting distortion of the waveform due to parasitic capacitance and parasitic resistance in wirings. By arranging these inverters 601 and 602, logic signals with inverted logic are supplied to the AND gates and also a desired repeater effect for wiring delay can be achieved. Furthermore, when a gate delay in the signal line for the input data B2 causes a problem, similarly to the input data B1, a non-inverse signal and an inverse signal may be generated in the signal input unit (buffer 510), and supplied through two wirings, thereby achieving a similar effect.

As described above, configurations for reducing the number of signal lines in the decoder of the print head are shown in the first and second embodiments. That is, by carrying out logic inversion by inverters in any of the areas between adjacent AND gates that are constituent elements of the decoder, the number of the signal lines inside the decoder is reduced compared with the conventional decoder. As a result, an increase in the substrate size can be largely suppressed.

The number of inverters necessary for reducing the number of wirings is generalized by expression (1).

$$\sum_{j=1}^{n} 2^{(j-1)} \quad (1)$$

Expression (1) defines the minimum number of inverters necessary for reducing the number of input signal lines connected to the decoders by i number of input signal lines, the number of necessary input signal lines conventionally being twice the number of input signals (namely, non-inverse signals and inverse signals). Specifically, the minimum number of inverters necessary for reducing the number of input signal lines by one is one, the minimum number of inverters necessary for reducing the number of input signal lines by two is three, and the minimum number of inverters necessary for reducing the number of input signal lines by three is seven.

From the viewpoint of a decoder itself, generally, a configuration in which circuit elements are arranged collectively is more effective, enabling the arrangement of the elements in a small area. However, in the print head, the arrangement of the circuit is restricted by the arrangement of nozzles that discharge ink. For this reason, circuit configurations illustrated in the embodiments of the present invention can improve the arrangement efficiency in the entire circuit of the print head, rather than the decoder itself.

As described above, in the present embodiment, in the print head, the logic elements are arranged distributed in the arrangement direction of the segments, thus enabling a reduction in the size of the region of wirings for inputting signals to the logic elements that is necessary with a configuration in which an increase in the size of the substrate end portion is suppressed. In addition, a configuration is not necessary in which a long wiring is driven via a comparatively large buffer, which is necessary for the conventional circuit configuration. As a result, further reduction of the substrate size is possible. Also, it is not necessary to arrange a repeater which is necessary in the conventional circuit configuration in order to avoid a wiring delay due to a long wiring, and thus the operational speed of the decoder can be maintained as well.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-085540, filed Apr. 1, 2010, which is hereby incorporated by reference herein in its entirety.

What is claimed is:

1. A print head comprising:
   a plurality of printing elements;
   a plurality of switching elements that are respectively connected to the plurality of printing elements and control current flow to the plurality of printing elements;
   a generating circuit that generates control signals, wherein each of the control signals is for selecting a printing element of the plurality of printing elements;
   a plurality of logical operations units that generate select signals based on the control signals generated by the generating circuit;
   a plurality of common signal lines, wherein each of the plurality of common signal lines transmits one of the control signals from the generating circuit;
   a plurality of sets of individual signal lines, wherein each of the plurality of sets of individual signal lines transmits one of the control signals and connects a logical operation unit of the plurality of logical operation units to common signal lines of the plurality of common signal lines; and
   a plurality of inverters, wherein each of the plurality of inverters is located on a common signal line of the plurality of common signal lines between adjacent logical operation units of the plurality of logical operation units such that logic of the control signal of one signal line of a set of the individual signal lines differs between the adjacent logical operation units.

2. The print head according to claim 1, wherein each of the inverters is located on a corresponding one of the common signal lines such that a sequence of logic of the control signal of the plurality of sets of individual signal lines is a Gray code sequence.

3. The print head according to claim 1, wherein adjacent printing elements and adjacent switching elements form a group, and one switching element is selected in each group based on the control signal.

4. The print head according to claim 3, wherein the generating circuit includes a shift register that holds information corresponding to the group.

5. The print head according to claim 1, wherein the generating circuit includes a shift register that outputs parallel data to the plurality of logical operation units.

6. The print head according to claim 1, wherein the plurality of common signal lines includes a first common signal line and a second common line, and a number of the inverters located on the first common signal line and a number of the inverters located on the second common signal lines are different from each other.

7. The print head according to claim 1, wherein a number of the inverters located on each the plurality of common signal lines is different from each other.

8. The print head according to claim 1, wherein the plurality of common signal lines are arranged along an alignment direction of the plurality of printing elements.

9. The print head according to claim 1, wherein a number of the inverters located on each of at least two common signal lines of the plurality of common signal lines is different from each other.

* * * * *